(12) United States Patent
Hoets et al.

(10) Patent No.: US 8,393,624 B2
(45) Date of Patent: Mar. 12, 2013

(54) BOOT WITH AN AXIALLY DISPLACED FIRST FASTENING REGION

(75) Inventors: Lukas Hoets, Duesseldorf (DE); Wolfgang Schlosser, Glauchau (DE)

(73) Assignee: GKN Driveline International GmbH, Lohmar (DE)

( * ) Notice: Subject to any disclaimer, the term of this patent is extended or adjusted under 35 U.S.C. 154(b) by 41 days.

(21) Appl. No.: 12/977,891

(22) Filed: Dec. 23, 2010

(65) Prior Publication Data

US 2011/0089644 A1 Apr. 21, 2011

Related U.S. Application Data

(63) Continuation of application No. PCT/EP2008/006657, filed on Aug. 13, 2008.

(30) Foreign Application Priority Data

Jun. 27, 2008 (DE) ........................ 10 2008 030 149

(51) Int. Cl.
*F16J 3/00* (2006.01)
*F16J 15/52* (2006.01)
*F16C 1/26* (2006.01)
*F16D 3/84* (2006.01)

(52) U.S. Cl. ........................ 277/634; 464/175
(58) Field of Classification Search .......... 277/634–646; 464/173–175
See application file for complete search history.

(56) References Cited

U.S. PATENT DOCUMENTS

| 3,255,838 | A | * | 6/1966 | Goldman | 180/254 |
| 3,292,390 | A | * | 12/1966 | Wildhaber | 464/158 |
| 3,914,852 | A | | 10/1975 | Fisher | |
| 4,145,896 | A | * | 3/1979 | Pringle | 464/123 |
| 4,456,269 | A | * | 6/1984 | Krude et al. | 277/636 |
| 4,747,805 | A | * | 5/1988 | Welschof et al. | 464/175 |
| 4,957,469 | A | * | 9/1990 | Zollinger | 464/175 |
| 5,772,521 | A | * | 6/1998 | Herchenbach et al. | 464/170 |
| 5,879,238 | A | * | 3/1999 | Breheret | 464/175 |
| 5,954,587 | A | * | 9/1999 | Jacob et al. | 464/145 |
| 6,676,527 | B2 | * | 1/2004 | Kudo et al. | 464/175 |
| 7,354,349 | B2 | * | 4/2008 | Wette | 464/173 |
| 7,699,710 | B2 | * | 4/2010 | Wette | 464/173 |
| 7,736,239 | B2 | * | 6/2010 | Niederhufner et al. | 464/175 |
| 2008/0048400 | A1 | * | 2/2008 | Dahlheimer | 277/391 |

FOREIGN PATENT DOCUMENTS

| EP | 1 223 360 A1 | 7/2002 |
| FR | 2 754 024 A1 | 4/1998 |
| GB | 2107412 A | 4/1983 |
| JP | 11 190358 A | 7/1999 |

OTHER PUBLICATIONS

PCT International Search Report for PCT/EP2008/006657 dated Mar. 19, 2009.

* cited by examiner

*Primary Examiner* — Vishal Patel
*Assistant Examiner* — Nicholas L Foster
(74) *Attorney, Agent, or Firm* — Rader, Fishman & Grauer, PLLC

(57) ABSTRACT

A boot which has reduced deformations during operation is disclosed. The boot includes a first fastening region, wherein the first fastening region is displaced axially, with respect to the direction of a main axis of the boot, and with respect to a housing part on which the boot can be mounted, in such a way that the first fastening region at least partially projects beyond an edge of the housing part.

7 Claims, 2 Drawing Sheets

(Prior Art)

though the first fastening region 12 is displaced axially,
BOOT WITH AN AXIALLY DISPLACED FIRST FASTENING REGION

CROSS REFERENCE TO RELATED APPLICATIONS

This application is a Continuation Application claiming benefit of PCT/EP2008/006657, filed on Aug. 13, 2008, which claims priority to German Application No. 102008030149.3, filed on Jun. 27, 2008, which applications are hereby incorporated by reference in their entirety.

TECHNICAL FIELD

The present disclosure relates to a boot with a first fastening region and to a system comprising such a boot and also a housing part.

BACKGROUND

Boots are used in particular for sealing joints, in particular in the automotive industry for sealing constant velocity sliding joints and fixed joints. However, other applications outside the automotive industry are also possible. Boots within the context of the present disclosure can take the form of rolling boots or folding boots.

Rolling boots of the aforementioned type are known from the prior art. For instance, FIG. 1 of the present application shows a section along a main axis 60 of a rolling boot according to the prior art having a first fastening region 12 intended for fastening to a joint housing and a second fastening region 14 intended for fastening to a shaft. Such a rolling boot, designated by the reference number 10 in FIG. 1, is mounted on fixed joints, for example. The first fastening region 12 here has an outer part 34 and an inner part 36, wherein an accumulation of material 38 in the form, for example of a peripheral annular bead is arranged in the inner part 36 so as to provide a seat in a peripheral groove on the outer lateral surface of a housing part. The first fastening region 12 is adjoined by a fold region 16 having a first fold peak region 20 with a first fold flank 22 close to the fastening region 12 and, opposite this first fold flank, a second fold flank 24, the fold peak region 20 being adjoined by a fold trough 26. The fold peak region 20 has a fold peak 21 with a maximum M. Furthermore, the rolling boot 10 according to the prior art shown in FIG. 1 is provided in its interior with reinforcing ribs 40 which are arranged in the fold region 16.

FIG. 4 of the present application shows a boot 10 according to FIG. 1 mounted on a housing part 54 of a fixed joint. The housing part 54 has an outer lateral circumferential surface 70 and also an end surface 68, between which surfaces a peripheral edge 55 is arranged. The boot 10 is mounted on the joint housing part 54 by a first fastening element 58, and on a shaft 56 in a second fastening region 14 using a second fastening element 62. The first fastening element 58 and also the first fastening region 12 of the boot 10 are in this case completely assigned to the outer lateral circumferential surface 70 of the joint housing part 54, or to the joint housing part 54 itself, and the first fastening region 12 is directly followed by a fold region 16 having exactly one fold in the example shown in FIG. 1 and FIG. 4.

A particular disadvantage with the known prior art as shown in FIGS. 1 and 4 is that, because of the complete overlapping of the outer lateral surface of the joint housing by the first fastening element and the first fastening region, the fold region displays large deformations during operation of the boot, for example when used in a fixed joint. Given the forces which act, particularly at high rotational speeds, and the associated high mechanical loading, it may occur that boots will possibly even burst during operation.

Therefore a boot and also a system comprising such a boot is needed in which the deformations acting in particular on the fold region, in particular those in the first fold of the fold region that is near the first fastening region, are reduced.

SUMMARY

A boot is disclosed herein, the boot having a first fastening region, wherein the first fastening region is displaced axially, as viewed in the direction of a main axis of the boot, and with respect to a housing part, such as, for example, a housing part of a constant velocity sliding joint or fixed joint. It is understood that the boot may be used with any other housing part, and may be used on a joint on which the boot can be mounted, in such a way that the first fastening region at least partially projects beyond an edge of the housing part. In one exemplary configuration, the first fastening region is provided with a base surface which makes available a seat for a first fastening element and which at least partially projects beyond the edge of the housing part, with respect to the main axis of the boot.

By virtue of the projecting length made available according to the disclosure by the first fastening region, there finally occurs an only partial overlapping of the outer lateral circumferential surface by the first fastening region or the first fastening element arranged on the base surface thereof. The fastening element then has, in addition to the known sealing function, a supporting function by virtue of the possibility made available by the first fastening element to make available, in the region of the projecting length, a support for the fold region, and here in particular the first fold of the fold region that is near the first fastening region. As a result, the deformation of the boot during operation is reduced overall and an increased rotational speed stability is thereby achieved. This has a particularly advantageous effect when the boot according to the disclosure is designed as a rolling boot, it also being possible within the context of the present disclosure for the boot to be designed as a folding boot having a plurality of folds in the fold region. However, a double-folding boot design is also possible, for example.

As already discussed above, the boot according to the disclosure may be used in fixed joints or else constant velocity sliding joints. However, it can also be arranged on any other type of joints, for example on ball joints, or else in pushrods, for sealing tube ends or other housing parts, in order to provide a sufficient degree of sealing and an additional supporting function. The present disclosure is thus not restricted in terms of the type of housing parts on which the boot can be mounted. Examples of applicable housing parts here are also tube ends of any type, including, for example, push rods, shafts or the like, but also joints and their outer joint housing.

The projecting length of the base surface of the first fastening region of the boot according to an exemplary configuration of the disclosure is advantageously situated in a range from approximately 20% to approximately 45%, preferably approximately 24% to approximately 35%, of a width of the first fastening element. With such a projecting length ratio, there is made available, on the one hand, a sufficient sealing function of the folding boot but also, on the other hand, a sufficient supporting function, provided by the first fastening element. If the projecting length were smaller, that is to say below 20%, a sufficient supporting function would not be provided under certain circumstances; on the other hand, if the projecting length were too large, the sealing function of the boot could be diminished. The use of the word "approximately" in the present connection makes it clear to the person skilled in the art who is being addressed that embodiments somewhat outside the stated range are hereby readily also covered by the scope of protection of the present disclosure. In particular, deviations of approximately plus/minus 10%, preferably approximately plus/minus 5%, of the respective upper and lower limits do not, within the context of the present disclosure, go outside the scope of protection thereof since a sufficient sealing and protective function can still be provided within these ranges.

In one exemplary configuration, the base surface of the first fastening region at least partially overlaps a transition region, as viewed in the direction of the main axis of the boot. The transition region adjoins the first fastening region in the direction of a second fastening region in the direction of the main axis of the boot, wherein the second fastening region often has a smaller inside and outside diameter than the first fastening region. Subsequently arranged after the transition region is a fold region which comprises at least one fold. If the fold region has exactly one fold, the boot according to the disclosure can be designed, for example, as a rolling boot. If it has two folds, it may be designed, for example, as a double-folding boot, or alternatively, if it has a plurality of folds, it is designed as a multi-folding boot. The transition region between the first fastening region and fold region can here be configured, for example, in such a way that it is thereby possible for the transition region to bear by way of its inner surface or an arrangement thereof closely against a peripheral end surface of a housing part. However, it is also possible to provide in the transition region for example a joint region which entails advantageous properties in the case of certain embodiments of folding boots in particular. Furthermore, additional retaining or orienting elements can also be arranged in the transition region, these elements facilitating a fastening of a first fastening element in the first fastening region. The first transition region is preferably configured in such a way that its inner surface is arranged opposite a peripheral end surface of a housing part, and with further preference is in contact therewith, i.e. bears against this surface. Then, by virtue of the overlapping of this transition region by the base surface of the first fastening region which makes available the binder seat, and after mounting the first fastening element, there is advantageously achieved a situation whereby the forces exerted by the mounting of the fastening element are transmitted into the first transition region, making it possible to further reduce a more pronounced deformation of the boot according to an embodiment of the disclosure. A complete overlapping here means that the base surface overlaps the entire material thickness of the transition region, and in this region makes available a binder seat for the first fastening element. Preferably, as viewed in the direction of the main axis of the boot, the projecting length is arranged axially displaced in the direction of the fold region of the boot and at least partially outside the transition region.

In a further exemplary configuration, at least two outer ribs bridge the first fastening region and the transition region at least in parts, with respect to a direction perpendicular to the main axis of the boot. The outer set of ribs advantageously achieves a situation whereby the boot according to the disclosure can be designed to be even more compact, and in particular can have a smaller inside volume. The displacement of the first fastening region already advantageously achieves a reduction in the overall height of the boot according to the disclosure, this reduction being further supported by the provision of an outer set of ribs. An outer set of ribs here is particularly advantageous in the case of rolling boots since they provide a sufficient degree of stability during deformation, and, on the other hand, the inside diameter of these boots is reduced, with the result finally that a reduction in the grease pressure is also achieved and higher service lives and a lower susceptibility to wear can be achieved.

In a further exemplary configuration of the present disclosure, a plurality of ribs are arranged with a uniform distribution on an outer circumferential surface of the boot. Provision may be made for the respective ribs to be arranged oppositely in pairs on the outer circumferential surface of the boot. For example, four, six, seven, eight, nine, ten or more such pairs can be arranged on the outer circumferential surface of the boot, depending on the requirements which are known to the person skilled in the art who is being addressed. Preference is given here to arranging the respective pairs with a uniform spacing from one another.

In yet another exemplary configuration, at least one of the ribs protrudes beyond the base surface of the first fastening region to form a positioning and/or bearing surface. The first fastening region constitutes a binder seat surface for a fastening element, for example a clamping strap, a clamp or a compression ring. However, other fastening elements known to a person skilled in the art can also be used within the context of the present disclosure. The specific design of at least one of the outer ribs, preferably at least half the number of outer ribs, more preferably all the outer ribs, serves to facilitate the positioning of this fastening element in the first fastening region, it additionally being the case that the fastening element can also bear by way of its peripheral side edge at least partially against the bearing surface formed by the at least one outer rib, i.e. is in direct contact with this bearing surface. Here, contact does not have to be made by the entire side face of the fastening element with respect to the overall height or thickness of the fastening element. Rather, the positioning and/or bearing surface can also only be at most approximately 90 percent, more preferably at most approximately 60 percent, of the overall height of the fastening element. The fastening element will in this case protrude beyond the positioning and/or bearing surface. In an exemplary arrangement, the positioning and/or bearing surface is designed to be substantially perpendicular in relation to the main axis of the boot, and is part of an offset which is arranged between that end of the first outer edge of the outer rib facing the first fastening region and the positioning and/or bearing surface. Here, this offset preferably has a second outer edge for the at least one outer rib, which edge is preferably oriented substantially parallel to the main axis of the rolling boot, and is part of the rib in question. However, provision can also be made here for this second outer edge for the at least one outer rib to have a slightly angled design, with respect to the main axis of the rolling boot, the angle between the second outer edge and the main axis of the rolling boot being smaller than that angle which is defined between the first outer edge of the at least one outer rib and the main axis of the rolling boot.

In one exemplary configuration, the outer rib preferably has a first outer edge which is directed away from the outer circumferential surface of the rolling boot. In one exemplary configuration, the first outer edge of the outer rib here starts approximately in the fold peak region of the first fold, more preferably exactly at the fold peak, i.e. the maximum of the first fold, and moreover preferably extends linearly and at an angle to the main axis of the rolling boot. However, provision can also be made for the first outer edge to have another design, for example to be curved.

Furthermore, the present disclosure also relates to a system consisting of a housing part, which may be part of a joint, such as part of a fixed joint, and even a joint itself, and of a boot as defined above. More specifically, an exemplary system according to the disclosure comprises at least a first fastening element, but may also include at least a second fastening element for fastening the rolling boot in a second fastening region, in particular on a shaft. The first fastening element bears at least by way of a portion of a side face against the positioning and/or bearing surface of at least one rib. In one exemplary configuration, the side face of the fastening element protrudes beyond the positioning and/or bearing surface of the rib. The base surface of the first fastening region, which base surface makes available a seat surface for the fastening element, is displaced axially with respect to the housing part and displaced with respect to the main axis of the boot in such a way that the base surface at least partially projects beyond an edge of the housing part, for example of a joint housing. The projecting length of the base surface here is preferably situated in a range from approximately 20 percent to approximately 45 percent, more preferably in a range from approximately 25 percent to approximately 35 percent, of a width of the first fastening element.

BRIEF DESCRIPTION OF THE DRAWINGS

These and further advantages of the present disclosure will be explained in more detail below with reference to the following figures, in which.

DETAILED DESCRIPTION

It should be stated first of all that the features shown in the figures are not restricted to the individual embodiments. Rather, the features in each case shown and indicated in the description, including the description of the figures, can be combined with one another for development purposes, identical features, including those from the prior art, are designated here by the same references. In particular, the subject of the present disclosure is not restricted to the embodiment, shown in the figures, of the system according to the disclosure for a fixed joint with a rolling boot. Rather, the present disclosure can be applied to boots of any type which are mounted on whatever parts for sealing purposes. In particular, it is also neither envisioned nor intended to restrict the disclosure to fixed joints in automobiles; rather, the boots according to the disclosure can be used in a large number of application areas, in particular in constant velocity sliding joints. Finally, it is also possible, in particular, to design the fold region in such a way that, if appropriate, second or other further folds can be provided.

Figure 1:
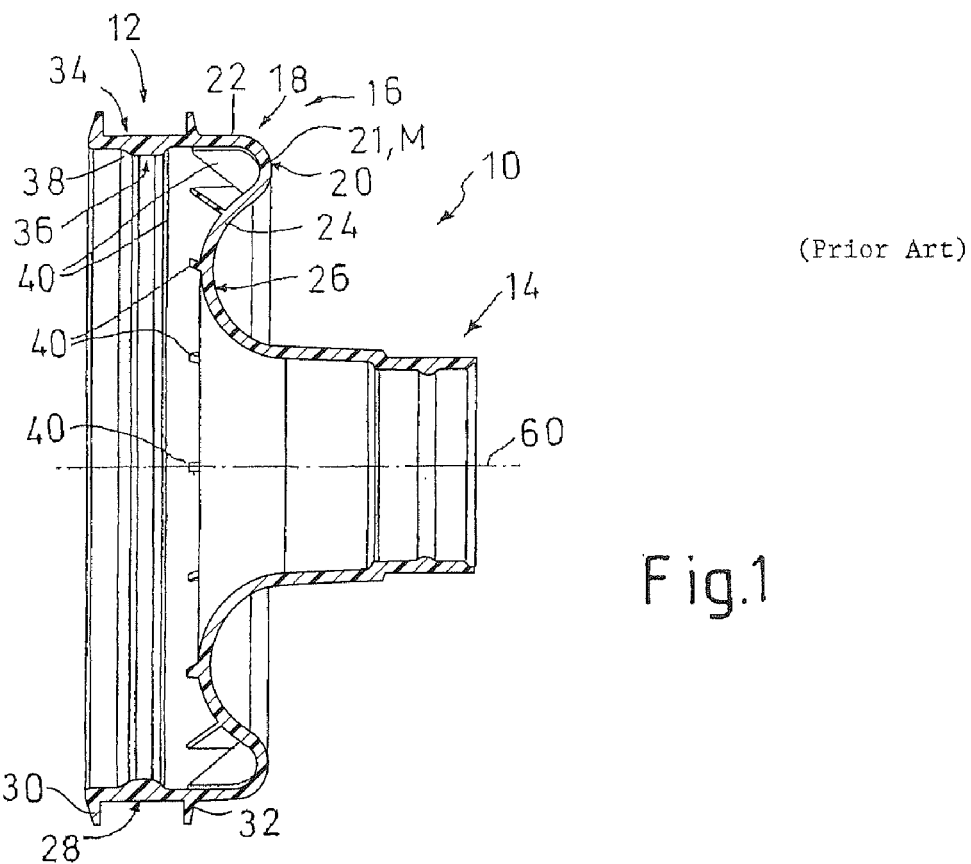
FIG. 1 shows a cross section along a main axis of a rolling boot according to the prior art.

FIG. 1 shows the folding boot according to the prior art already described in the background, this boot having in its interior a plurality of inner ribs 40 arranged in the fold region 16 in order to achieve a sufficient degree of rigidity. It is clearly evident from FIG. 1 that the folding boot 10 according to the prior art shown therein is relatively bulky.

Figure 4:
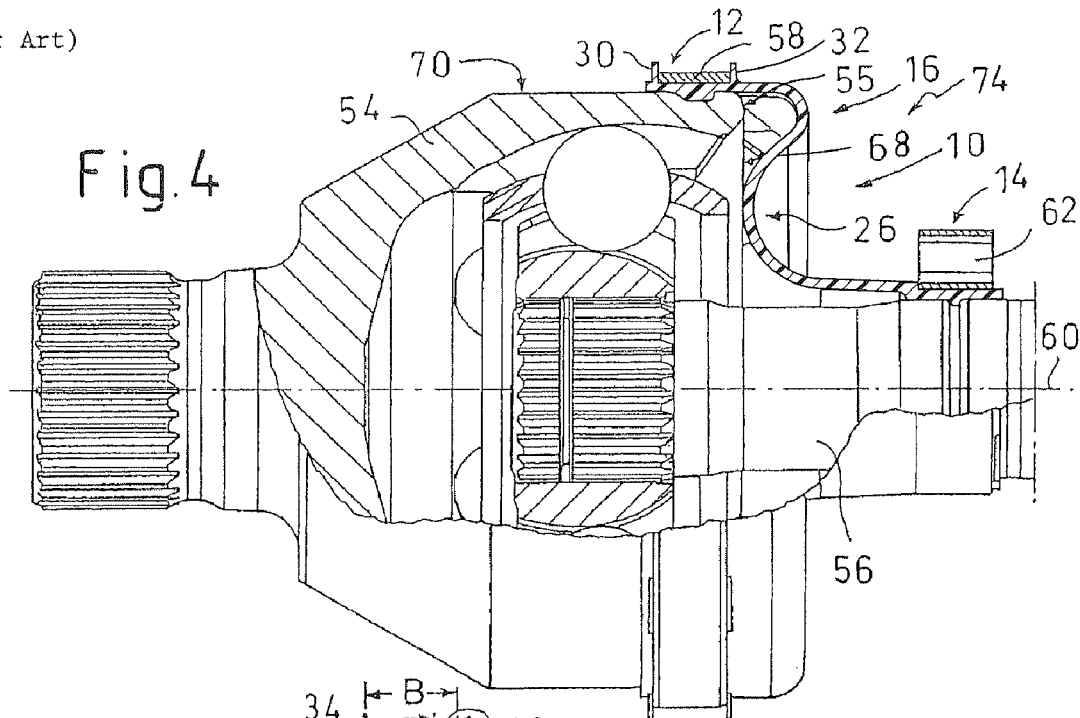
FIG. 4 shows a sectional view through a system according to the prior art comprising a housing part of a fixed joint, a rolling boot in accordance with FIG. 1, a shaft and first and second fastening elements.

FIG. 4 shows the folding boot 10 according to the prior art as shown in FIG. 1 mounted on a fixed joint housing having a housing part 54 with an outer lateral circumferential surface 70 and a shelf 56, the folding boot 10 being mounted in the first fastening region 12 on the housing part 54 using a first fastening element 58 and in the second fastening region 14 on the shelf 60 housing a second fastening element 62. This forms an overall system 74. The first fastening region 12 receives over its full surface the first fastening element 58, which comes to lie between a first retaining element 30 and a second retaining element 32. The first and second retaining elements 30 or 32 in this embodiment of a boot 10 according to the prior art can here be embodied as peripheral webs, but also as interrupted webs, for example also in the form of "ear webs", which have a rounded outer contour as viewed in a direction perpendicular to the main axis 60 of the boot 10. In the embodiment of the system 74 as shown in FIG. 4, in this case the base surface 28 of the first fastening region of the boot 10 is identical to the binder seat surface.

It is clearly evident from FIG. 4 that the first fastening region, and hence also the base surface 28 thereof, does not project beyond a housing edge 55 which is arranged in the transition from the outer lateral circumferential surface 70 to a peripheral end surface 68 of the housing part 54.

Figures 2, 3:
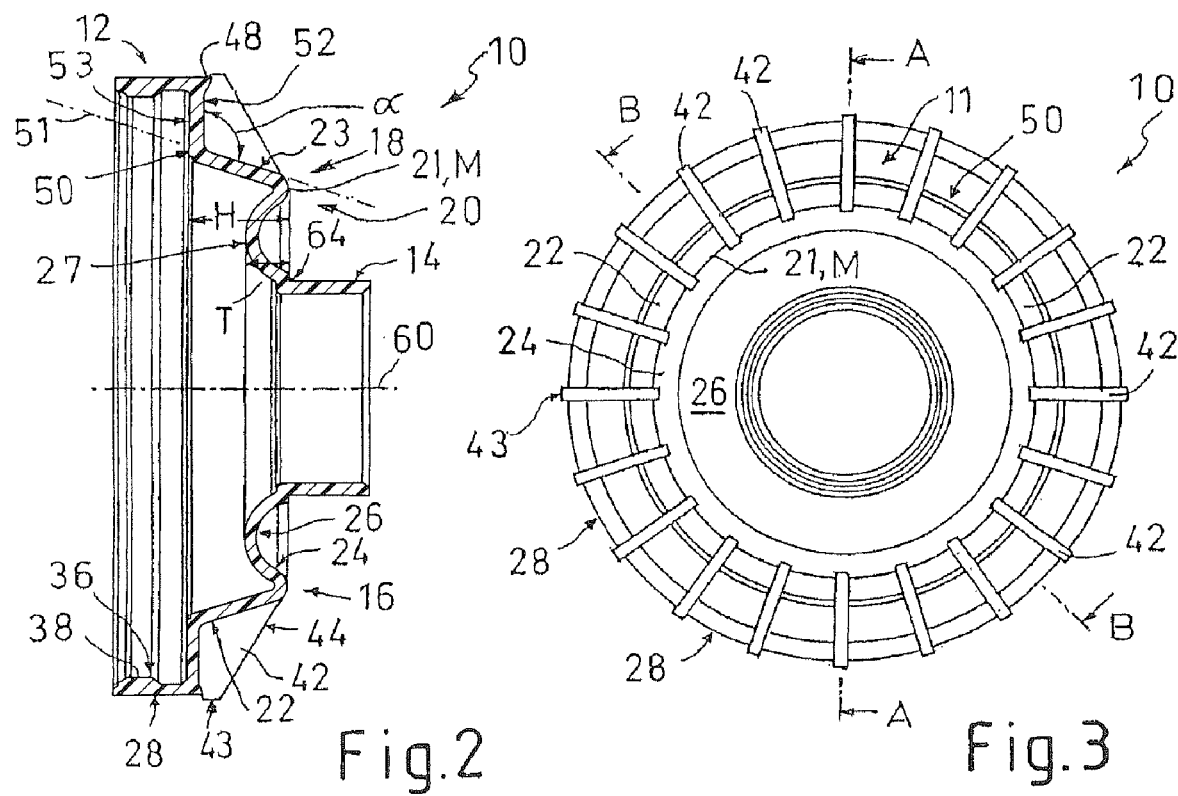
FIG. 2 shows a cross section on a line B-B in FIG. 3 along a main axis of a rolling boot according to an exemplary embodiment of the disclosure.
FIG. 3 shows an outer view of the rolling boot according to the disclosure as shown in FIG. 2.
Figure 5:
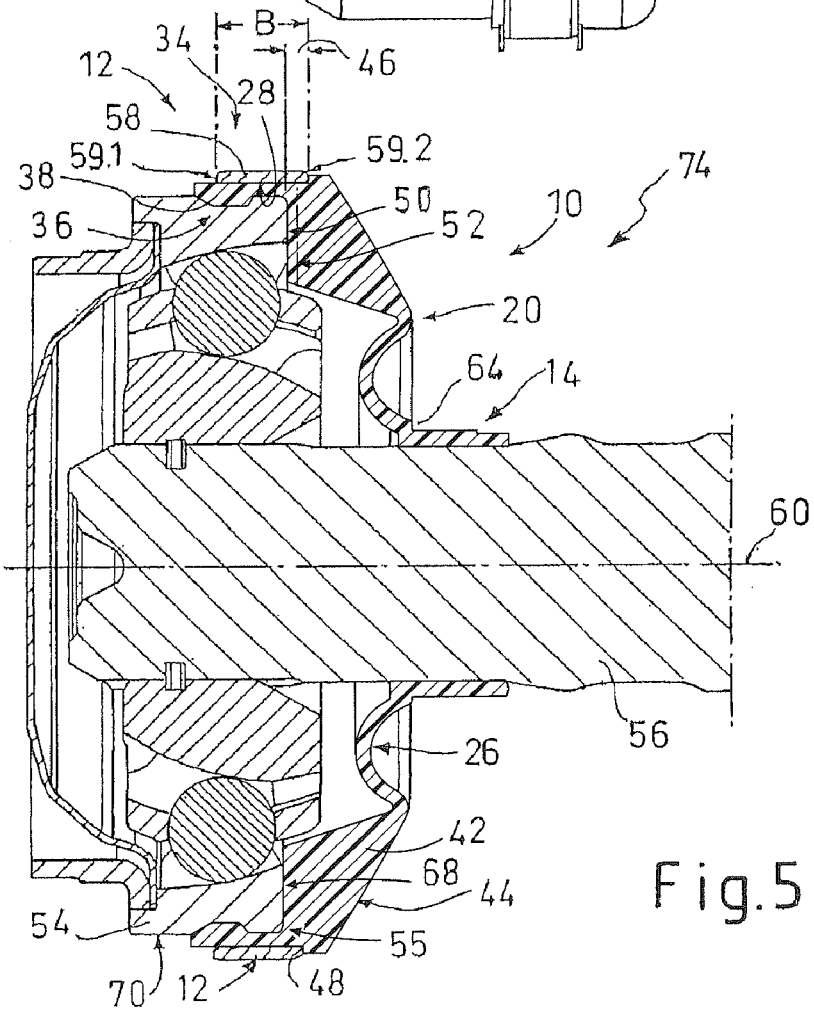
FIG. 5 shows a cross section on a line A-A in FIG. 3 through a system according to an exemplary embodiment of the disclosure comprising a joint housing, a folding boot according to FIGS. 2 and 3 and a first fastening elements for fastening the folding boot to the housing part.

FIG. 2 now shows a folding boot 10 according to an exemplary embodiment of the present disclosure with a first fastening region 12 and a second fastening region 14, wherein an interior 36 of the boot 10 is assigned, in the first fastening region 12, an accumulation of material 38, formed as a peripheral annular bead, which can engage in a corresponding peripheral annular groove on a housing part (see FIG. 5 in this respect). The first fastening region 12 makes available a base surface 28 which has a greater width than the width of a fastening element 58, as can be seen from FIG. 5. The first fastening region is adjoined by a transition region 50 with an outer base surface 52 and an inner base surface 53. In the example shown here, this transition region is designed in such a way that it extends substantially perpendicularly to a main axis 60 of the boot 10, and moreover bears against the outer peripheral end surface 68 of the housing part 54 or is arranged close to it, as can also be seen from FIG. 5. Following the transition region 50 is provided a fold region 16 which has a first fold 18 with a first fold flank 22 near the first fastening region 12 and, opposite this first fold flank, a second fold flank 24. The first fold 18 here has a fold peak region 20 with a fold peak 21 and a maximum M. The first fold 18 is followed by a fold trough 26 which is directly adjoined by the second fastening region 14.

Furthermore, the boot according to one exemplary configuration of the disclosure as shown in FIG. 2 has an outer rib 42 with a first outer edge 44, which starts at the maximum M of the fold peak region, i.e. at the fold peak 21, and a second outer edge 43 which extends substantially parallel to the main axis 60 of the boot 10. The outer rib 44 here makes available a bearing and/or positioning surface 48 for the fastening element 58 (see FIG. 5). For this purpose, the outer rib 42 protrudes somewhat beyond the base surface 28 of the first fastening region 12, with the result that the second outer edge 43 also protrudes beyond the base surface 28 and in so doing is formed substantially parallel to this surface.

An angle α, which is approximately 110°, is formed between the outer base surface 52 and an outer side 23 of the first fold flank 22 of the fold 18. In principle, the angle a within the context of the present invention is measured between an outer base surface 52 of the transition region 50 and an outer side 23 of a first fold flank 22 of the first fold 18. In one exemplary configuration, the angle α is preferably situated in a range from approximately 90° to approximately 140°, with further preference in a range from approximately 100° to approximately 130°.

It is also evident from FIG. 2 how a height H of the first fold 18 within the context of the present disclosure is determined. This involves measuring the region between a tangent extending through the maximum M or the fold peak 21 of the first fold 18, this tangent being oriented perpendicularly to the main axis 60 of the boot 10, and an inner base surface 53 of the transition region 10. Since this base surface in the exemplary embodiment is likewise oriented perpendicularly to the main axis 60 of the boot 10, the tangent extending through the fold peak 21 of the maximum M of the first fold 18 extends parallel to this inner base surface 53 of the transition region 50. However, provision can also be made for the inner base surface 53 of the transition region 50 to be arranged at an angle in relation to the main axis 60 of the rolling boot 10.

In the context of the present disclosure, the depth T of the fold trough 26 is determined by measuring the region between a tangent extending on an inner base surface 27, i.e. the minimum of the fold trough 26 directed toward the interior of the boot 10, and perpendicularly to the main axis 60 of the boot 10, and that tangent which extends through the fold peak 21 or the maximum M of the first fold 18 and perpendicularly to the main axis 60 of the boot 10. Since both tangents thus extend parallel and perpendicularly to the main axis 60 of the boot 10, the depth T can be determined simply.

As can be seen from FIG. 2, the depth T is approximately 42 percent of the height H.

FIG. 3 shows the line B-B along which was taken the section of the boot 10 which can be seen in FIG. 2. Furthermore, FIG. 3 shows particularly clearly that plurality of outer ribs 42, more precisely a total of 10 rib pairs 42, that is to say a total of twenty outer ribs 42, are arranged on an outer circumferential surface 11 of the boot 10. It can also be clearly seen that the outer ribs 42 fractionally protrude beyond the base surface 28 of the first fastening region 12 so as to form a bearing and positioning surface 48, the outer edge 43 for this purpose being indicated in FIG. 3 to make this clear.

FIG. 5 now shows a system 74 according to an exemplary embodiment of the disclosure, comprising a boot 10 as shown in one of FIGS. 2 and 3 and also a housing part 54, here a fixed joint, together with a first fastening element 58. FIG. 5 also shows a shaft 56. The housing part 54 has an outer lateral circumferential surface 70 and an outer end surface 68, between which surfaces is arranged a housing edge 55. The fastening element 58 has a first side face 59.1 and a second side face 59.2, in one embodiment of the fastening element 58, for example as a compression ring, are to be regarded as peripheral side faces. Not shown in FIG. 5 is a second fastening element 62 which serves to fasten the boot 10 on the shaft 56 in the second fastening region 14. In the second fastening region can be clearly seen an offset 64 at which the fold trough 26 merges into the second fastening region 14. The offset 64 here is designed to be peripheral so as to produce a bearing and/or positioning surface for a second fastening element 16, not shown in FIG. 5. Moreover, the section through the system 74, with respect to the boot 10, was taken along a line A-A in FIG. 3.

In the system 74 according to the exemplary configuration of the disclosure shown in FIG. 5, the fastening element 58 projects beyond the housing edge 55 by a projecting length 46. This projecting length 46 is determined by the outer end surface 68 of the housing part 54 on the one hand and, on the other hand, by the bearing and/or positioning surface 48, made available by the outer rib 42. This projecting length 46 is a portion of the base surface 28, but also of the binder seat surface, of the first fastening region 12. FIG. 5 also shows the width 8 of the fastening element 58 determined by the two outer side faces 59.1 and 59.2 thereof. The projecting length 46 here is somewhat more than 25 percent of the width of the first fastening means 58.

What is claimed is:

1. A system comprising a housing, at least a first fastening element and a boot, wherein the boot further comprises: a first fastening region with a base surface that defines a seat for a first fastening element in a radial direction as viewed in the direction of a main axis of the boot, whereby to the first fastening region an accumulation of material, formed as a peripheral annular bead, is assigned to an interior of the boot, wherein the first fastening region is displaced axially, as viewed in the direction of the main axis of the boot, and with respect to a housing part on which the boot is mounted, such that the first fastening region at least partially projects axially beyond an edge of the housing part that defines an end face and wherein the base surface at least partially projects beyond the edge of the housing part so as to define a projecting length that is in a range from approximately 20% to approximately 45% of a width of the first fastening element and wherein the projecting length of the base surface is arranged axially displaced in the direction of the a fold region of the boot and at least partially outside of a transition region; wherein at least two outer ribs bridge, at least in part, the first fastening region and the transition region, with respect to a direction perpendicular to the main axis of the boot, wherein at least one of the ribs protrudes radially beyond the base surface of the first fastening region to form a positioning and/or bearing surface and wherein the first fastening element oriented in the radial direction as viewed in the direction of the main axis of the boot, wherein the first fastening element is defined as a band having first and second peripheral side faces.

2. The system as claimed in claim 1, wherein the base surface of the boot at least partially overlaps the transition region, as viewed in the direction of the main axis of the boot.

3. The system as claimed in claim 1, wherein a plurality of ribs are arranged with a uniform distribution on an outer circumferential surface of the boot.

4. The system as claimed in claim 1, wherein the rib has a first outer edge which starts approximately at a maximum of a fold peak region of a first fold.

5. The system as claimed in claim 1, wherein said boot is designed as a rolling boot or folding boot.

6. A system comprising a housing part, a boot, and a first fastening element; wherein the first fastening element is a band defined by first and second peripheral end faces; wherein the boot comprises a radially oriented first fastening region with a base surface that defines a seat for the first fastening element, whereby to the first fastening region an accumulation of material, formed as a peripheral annular bead, is assigned to an interior of the boot, wherein the first fastening region is displaced axially, as viewed in the direction of a main axis of the boot, and with respect to a housing part on which the boot can be mounted, such that the first fastening region at least partially projects in an axial direction beyond an edge of the housing part and wherein the base surface at least partially projects in an axial direction beyond the edge of the housing part so as to at least partially overlap a transition region, as viewed in the direction of the main axis of the boot; wherein at least two outer ribs bridge, at least in part, the first fastening region and the transition region, with respect to a direction perpendicular to the main axis of the boot, and wherein at least one of the ribs protrudes radially beyond the base surface of the first fastening region to form a positioning and/or bearing surface; and wherein one of the first and second peripheral end faces of the first fastening element bears against the positioning and/or bearing surface formed by the radially protruding at least one rib.

7. The system as claimed in claim 6, wherein one of the first and second peripheral end faces of the first fastening element protrudes radially beyond the positioning and/or bearing surface of the rib.

* * * * *